US009369212B2

(12) United States Patent
Kramer et al.

(10) Patent No.: US 9,369,212 B2
(45) Date of Patent: Jun. 14, 2016

(54) SYSTEM, METHOD AND APPARATUS FOR POWER SAVING USING BURST-MODE TRANSMISSION OVER POINT-TO-POINT PHYSICAL CONNECTIONS

(71) Applicant: Broadcom Corporation, Irvine, CA (US)

(72) Inventors: Glen Kramer, Petaluma, CA (US); Lowell David Lamb, San Ramon, CA (US); Jaroslaw Wojtowicz, Santa Rosa, CA (US); Ryan Edgar Hirth, Windsor, CA (US)

(73) Assignee: BROADCOM CORPORATION, Irvine, CA (US)

( * ) Notice: Subject to any disclaimer, the term of this patent is extended or adjusted under 35 U.S.C. 154(b) by 121 days.

(21) Appl. No.: 14/010,613

(22) Filed: Aug. 27, 2013

(65) Prior Publication Data

US 2015/0023660 A1 Jan. 22, 2015

Related U.S. Application Data

(60) Provisional application No. 61/856,879, filed on Jul. 22, 2013.

(51) Int. Cl.
*H04B 10/564* (2013.01)
*H04B 10/077* (2013.01)

(52) U.S. Cl.
CPC .......... *H04B 10/564* (2013.01); *H04B 10/0773* (2013.01); *H04B 10/0775* (2013.01)

(58) Field of Classification Search
None
See application file for complete search history.

(56) References Cited

U.S. PATENT DOCUMENTS 7,630,639 B2 12/2009 Kramer et al.
7,729,463 B2 * 6/2010 Yousef et al. ........ H04H 20/426 375/357
2005/0058452 A1 * 3/2005 Kramer et al. .................. 398/71
2012/0008937 A1 * 1/2012 Cheng et al. ...................... 398/1
2012/0301138 A1 * 11/2012 Tolliver .......................... 398/25
2013/0272708 A1 * 10/2013 Mizuguchi et al. ............. 398/71
2014/0293135 A1 * 10/2014 Shao et al. ....... H04N 21/43632 348/634

* cited by examiner

*Primary Examiner* — Shi K Li
*Assistant Examiner* — Mina Shalaby
(74) *Attorney, Agent, or Firm* — Foley & Lardner LLP; Christopher J. McKenna; Daniel E. Rose

(57) ABSTRACT

A system, method and apparatus for power saving using burst-mode transmission over point-to-point physical connections. In one embodiment, a physical layer device (PHY) is provided that includes a data detector that is configured to generate a first control signal upon receipt of a non-idle code group over an interface between the PHY and a media access control (MAC) device and to generate a second control signal when all data received from the MAC device has been transmitted by the physical layer device. The PHY also includes a laser for transmission of data over an optical network cable, the laser being configured to perform a first transition from an off state to an on state based on the first control signal, and to perform a second transition from the on state back to the off state based on the second control signal.

20 Claims, 8 Drawing Sheets

SYSTEM, METHOD AND APPARATUS FOR POWER SAVING USING BURST-MODE TRANSMISSION OVER POINT-TO-POINT PHYSICAL CONNECTIONS

This application claims priority to provisional application no. 61/856,879, filed Jul. 22, 2013, which is incorporated herein by reference in its entirety.

BACKGROUND

1. Field of the Invention

The present invention relates generally to energy efficiency and, more particularly, to a system, method and apparatus for power saving using burst-mode transmission over point-to-point physical connections.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
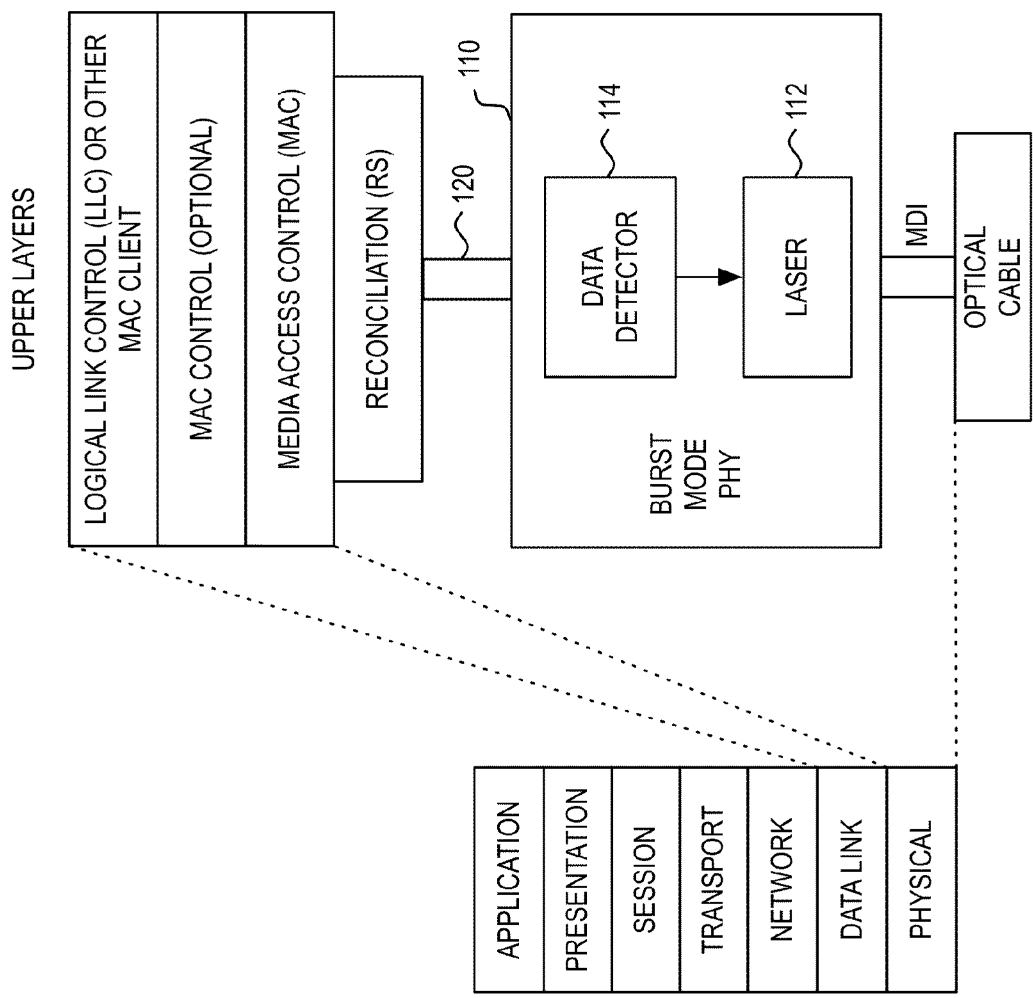
FIG. 1 illustrates an OSI layering diagram incorporating a physical layer device according to the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Reduced power consumption is a fundamental goal of modern communications networks. Energy efficiency has gown in importance as enterprises seek to manage their communication networks in a cost-effective manner. Energy efficiency is yet another metric that can be managed, tracked and improved upon as network management efforts seek to generate maximal return with their communications infrastructure.

In the present invention, it is recognized that bursty nature of real network traffic can be leveraged to produce energy savings. These energy savings can be independent from or can cooperate with advanced power-saving network protocols that can be defined to produce energy savings (e.g., IEEE 802.3az).

The extreme burstiness of network traffic has many implications. One significant implication of such burstiness in network traffic is that even under very heavy network load, many non-bottleneck links remain idle most of the time. In the present invention, it is recognized that a power-saving mechanism that is able to react quickly to the presence of the idle periods in minimizing power consumption during those periods can provide significant power saving efficiency without negative impact on the network service quality.

It is a feature of the present invention that a burst-mode transmission in physical layer devices can be used to generate energy savings in point-to-point links. As this burst-mode transmission feature in physical layer devices is not dependent on higher layer device intelligence and coordination, the burst-mode transmission feature can be applied to legacy systems. Increased energy savings can therefore be produced in the network without requiring significant loss of prior network investment.

In one embodiment, a physical layer device (PHY) is provided that includes a data detector that is configured to generate a first control signal upon receipt of a non-idle code group over an interface between the PHY and a media access control (MAC) device and to generate a second control signal when all data received from the MAC device has been transmitted by the physical layer device. In one embodiment, the data detector is part of a physical coding sublayer (PCS) of the PHY. The PHY also includes a laser for transmission of data over an optical network cable, the laser being configured to perform a first transition from an off state to an on state based on the first control signal, and to perform a second transition from the on state back to the off state based on the second control signal, wherein the sequence of the first transition and the second transition enables the laser in the PHY to transmit a burst of traffic received from the MAC device, and a receiver that is configured to wake up periodically from a sleep state and to perform a synchronization when it is determined that an input optical signal level is greater than a predefined power level. In one embodiment, the second control signal can be generated when a buffer in the PHY only contains idle code groups. In one embodiment, the PHY is part of a pluggable module. For example, the PHY can be one of a SFP, SFP+, XENPAK, X2, XFP, XPAK, or the like modules.

In one embodiment, a method performed by a PHY includes detecting a receipt of a non-idle code group over an interface between the PHY and a MAC device, generating a first control signal upon the detected receipt of the non-idle code group, transitioning a laser in the PHY from an off state to an on state in response to the generated first control signal, transmitting, by the laser, data received over the interface, and after completion of the transmission of the data received over the interface, transitioning the laser from the off state back to the on state.

FIG. 1 illustrates an OSI layering diagram incorporating a burst-mode PHY according to the present invention. As illustrated, the physical layer interfaces with a particular optical cabling medium via a medium dependent interface (MDI). In addition to the PCS, the physical layer can also include a physical medium attachment (PMA) and physical media dependent (PMD) sublayers. As illustrated, the physical layer is coupled to a reconciliation sublayer (RS), which provides a signal mapping between interface 120 and the MAC layer. In various examples, interface 120 can be based on an Attachment Unit Interface (e.g., GBIC, XAUI, XLAUI, CAUI, etc.), media independent interface (e.g., GMII, XGMII, XLGMII, CGMII, etc.), etc. As would be appreciated, the principles of the present invention are not dependent on a particular speed of interface 120.

In the illustrated embodiment of FIG. 1, the physical layer is implemented as PHY 110, which includes laser 112 for point-to-point communication with a link partner over an optical cable. PHY 110 can be embodied as a burst-mode PHY, which supports burst-mode transmission in the point-to-point link. In the present invention, the burst-mode transmission can be used to save power in a manner that is independent of higher-layer protocols. For example, control of the entry and the exit into burst-mode transmission can be independent of controls passed by the MAC over interface 120, which controls can be designed to identify a burst-mode transmission window.

Here, it is recognized by the present invention that such an embodiment enables energy saving features to be implemented in a point-to-point link by the PHY, wherein the MAC can be a legacy device that does not include energy saving features. As would be appreciated, the inclusion of new features in a pluggable PHY can be used to expand the functionality of a large installed base of MAC-containing legacy devices (e.g., high-bandwidth switches). Next generation PHYs that integrate with such MAC-containing legacy devices would not require the requalification of new MAC-containing devices. As such, the expansion of energy-saving features would not be limited to the replacement rates of existing legacy devices.

In one embodiment, the control of laser 112 can be enabled via data detector 114, which can operate independently of higher-layer controls. In one embodiment, data detector 114 is implemented in the PCS of PHY 110 and can be configured to detect the presence or absence of data available for transmission by PHY 110. In general, data detector 114 can be configured to cause PHY 110 to transition its laser from an off state to an on state upon detection of data transmitted over interface 120, and can be configured to cause PHY 110 to transition its laser from an on state to an off state upon detection of an absence of data for transmission to a link partner. While the particular timing of the transitions between the laser on/off states can vary due to the granularity of the control, it is significant that the impetus for such transitions is based on a PHY-level control.

Figure 2:
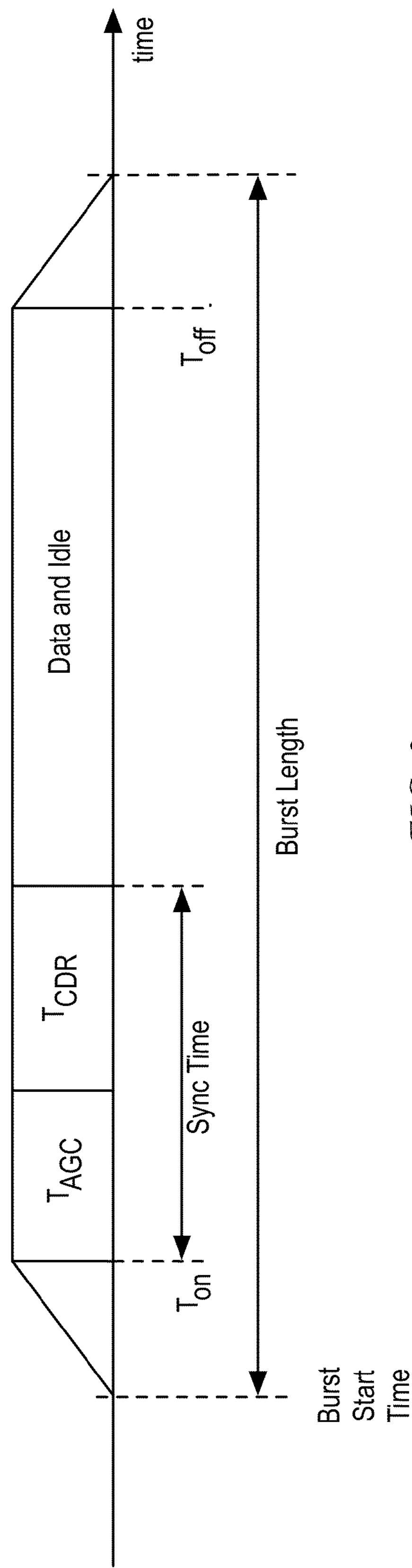
FIG. 2 illustrates an example of a burst in a physical layer device of the present invention.

Prior to describing further details of such a control mechanism, reference is made first to FIG. 2, which illustrates an example of a burst in a PHY of the present invention. As illustrated, a transmission burst begins with a $T_{on}$ time interval that represents the time needed to turn on the laser and for its output power to stabilize. A synchronization time period then follows for automatic gain control (AGC) and clock and data recovery (CDR), which are illustrated as a $T_{AGC}$ time interval and $T_{CDR}$ time interval, respectively. Here, the $T_{AGC}$ time interval represents the time needed by the receiver to adjust the gain based on the levels of the incoming signal, and the $T_{CDR}$ time interval represents the time needed by the receiver to acquire phase and frequency lock on the incoming data signal.

Once the synchronization period is complete, a Data and Idles time interval can include data frames and inter-frame gaps (IPGs). Finally, at the conclusion of the Data and Idles time interval, the $T_{off}$ time interval follows, which represents the time needed to turn off the laser.

Figure 3:
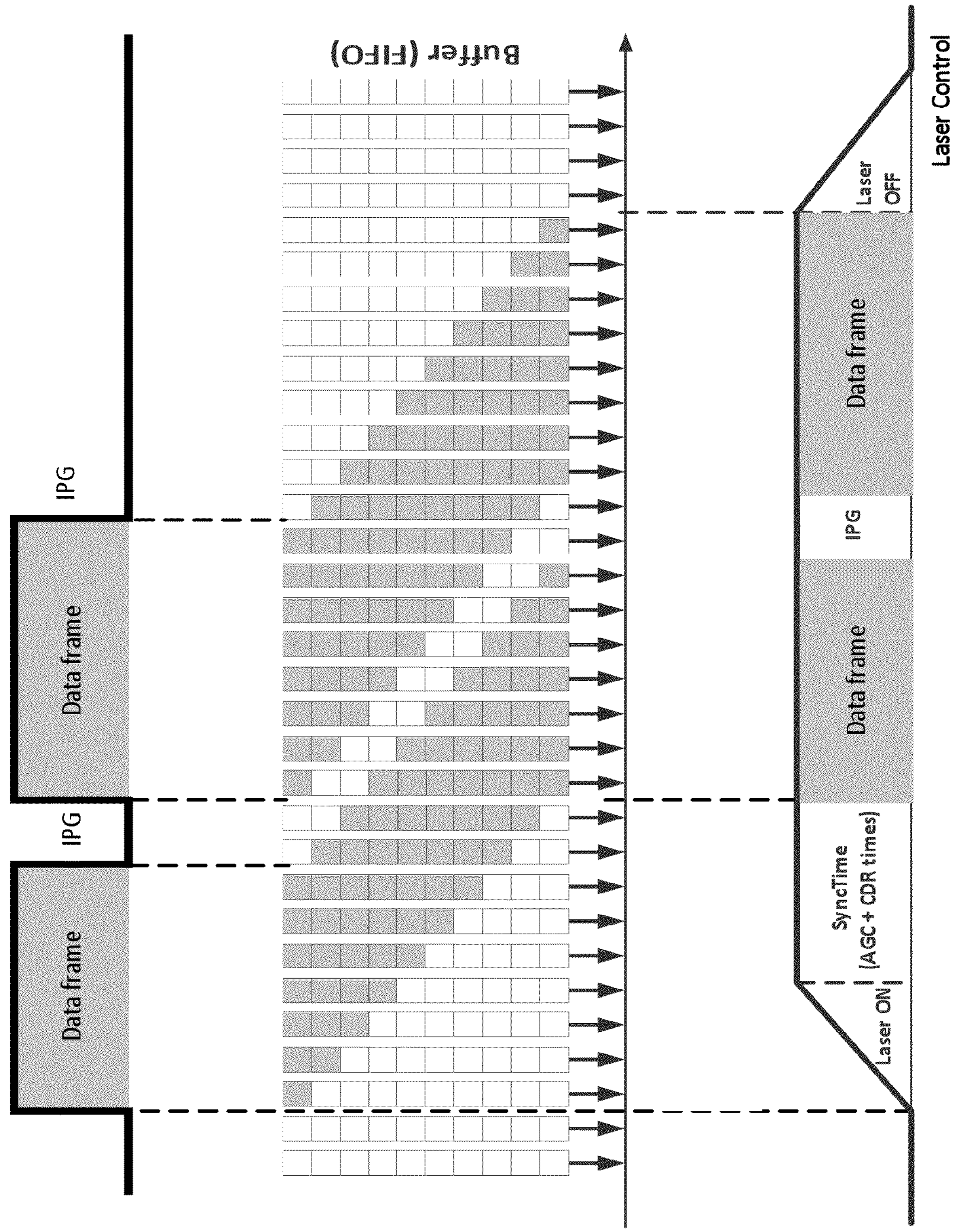
FIG. 3 illustrates an example operation in a point-to-point link of an embodiment of a data detector in a burst-mode physical layer device of the present invention.

As noted above, the control of the $T_{on}$ time interval and the $T_{off}$ time interval in the burst-mode transmission timing is based on a PHY-level control such as a data detector in the PHY. In one embodiment, the data detector is implemented in a PCS of the PHY. FIG. 3 illustrates an example operation of an embodiment of a data detector in a burst-mode PHY of the present invention. In the embodiment illustrated in FIG. 3, the data detector is based on the monitoring of a first-in-first-out (FIFO) buffer in the burst-mode PHY. In general, the data detector of the present invention can operate on different units of data (e.g., 10-bit code groups for 1000BASE-T, 66-bit code groups for 10GBASE-T, 53-byte cells for ATM, etc.).

The example illustration of FIG. 3 correlates a passage of a data stream through the buffer in the PHY relative to the burst-mode transmission timing illustrated in FIG. 2. As the data stream is passed over the MAC/PHY interface, the first non-idle code group would be stored in the buffer in the PHY. The detection of such a storage of a non-idle code group in the buffer can be used to initiate the $T_{on}$ time interval where the laser is turned on. As the data frame continues to fill the buffer, the $T_{on}$ time interval would complete and the synchronization time period would commence. The emergence of the first non-idle code group from the buffer is shown as roughly coinciding with the beginning of the Data and Idles time period where the transmitter and receiver on the point-to-point link are ready for transmission of data across the optical fiber cable.

In one embodiment, the buffer in the PHY can be sized to correspond with the total time of the $T_{on}$ time interval, $T_{AGC}$ time interval and the $T_{CDR}$ time interval. Here, it should be noted that the synchronization time period would also include the synchronization activity at the receiver. As would be appreciated, this correspondence need not be exact. In general, the buffer can be sized to ensure that the laser is ready for transmission when non-idle code groups exit the buffer. As such, the particular timing of when the $T_{on}$ time interval begins relative to the entry of non-idle code groups into the buffer or receipt of the non-idle code groups over the MAC/PHY interface can vary.

As illustrated, the passage of multiple data frames and their IPGs would continue to pass through the buffer for transmission. In the illustrated example, the Data and Idles time interval of the burst-transmission period would continue until only idle code groups are present in the buffer. This particular condition represents the general criteria of a PHY having no data available for transmission to the link partner. In other words, all of the data that was sent to the PHY over the MAC/PHY interface has been transmitted to the link partner. Upon identifying such a condition, the burst-mode PHY can then proceed to initiate the $T_{off}$ time interval where the laser is turned off. Power savings can then commence. As would be appreciated, the bursty nature of most data traffic profiles would enable a burst-mode PHY to generate frequent energy savings.

Here, it should be noted that the initiation of the $T_{off}$ time interval need not occur as soon as the last non-idle code group has exited the buffer. In one embodiment, a guard period is defined such that a laser remains on for a further time period to ensure that further bursts of data are not closely following the just-completed burst transmission. As would be appreciated, the existence or length of such a guard period can be dependent on a level of aggressiveness in producing power savings by the burst-mode PHY.

In one embodiment, the principles of the present invention can be applied to both directions of a point-to-point link. In this embodiment, an optical module design is provided where a burst-mode transmitter is combined with a burst-mode receiver to form a burst-mode transceiver module. Where a point-to-point link architecture utilizes burst-mode transceivers at both ends of the link, unscheduled data-driven bi-directional burst mode transmission can be enabled in the point-to-point link.

Figure 4:
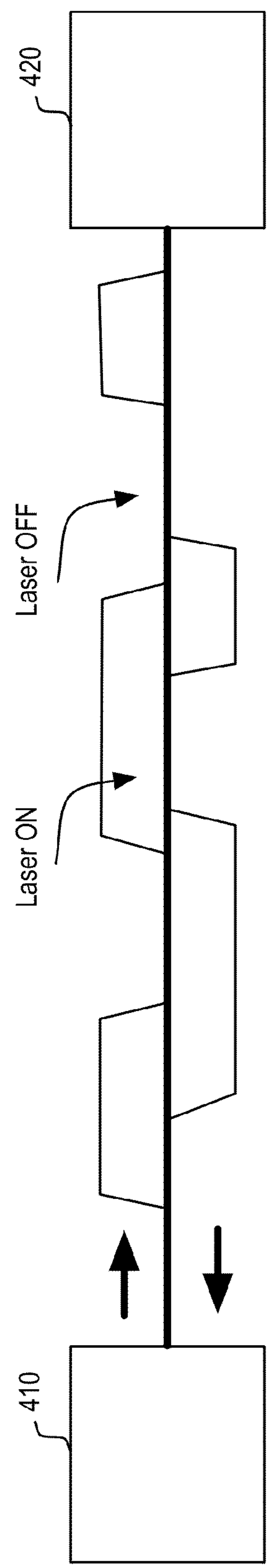
FIG. 4 illustrates an example of bi-directional transmission of data using a burst mode in a point-to-point link application.

FIG. 4 illustrates an example of bi-directional transmission of data using a burst mode in a point-to-point link application. As illustrated, the point-to-point link is based on link partners 410 and 420, which communicate over an optical fiber cable. FIG. 4 provides an illustration of a first direction of transmission from link partner 410 to link partner 420 above the center line, and provides an illustration of a second direction of transmission from link partner 420 to link partner 410 below the center line. For both directions of transmission laser ON periods are defined by burst-mode transmission time intervals such as that illustrated in FIG. 2, while laser OFF periods are defined as the time periods between consecutive burst-mode transmission time intervals. As illustrated, the burst-mode transmission time intervals from link partner 410 to link partner 420 need not coincide with the burst-mode transmission time intervals from link partner 420 to link partner 410. This results because the initiation and termination of each burst-mode transmission time interval is based on the data detector in one of link partners 410 and 420.

In one embodiment, the burst-mode receiver improves energy efficiency by also shutting down its operation as well. In this embodiment, the burst sync time interval can be designed to exceed the sum of the receiver sleep period and the AGC/CDR intervals required by the receiver to wake up from the sleep state. This ensures that every data burst can be received reliably by the link partner.

Figure 5:
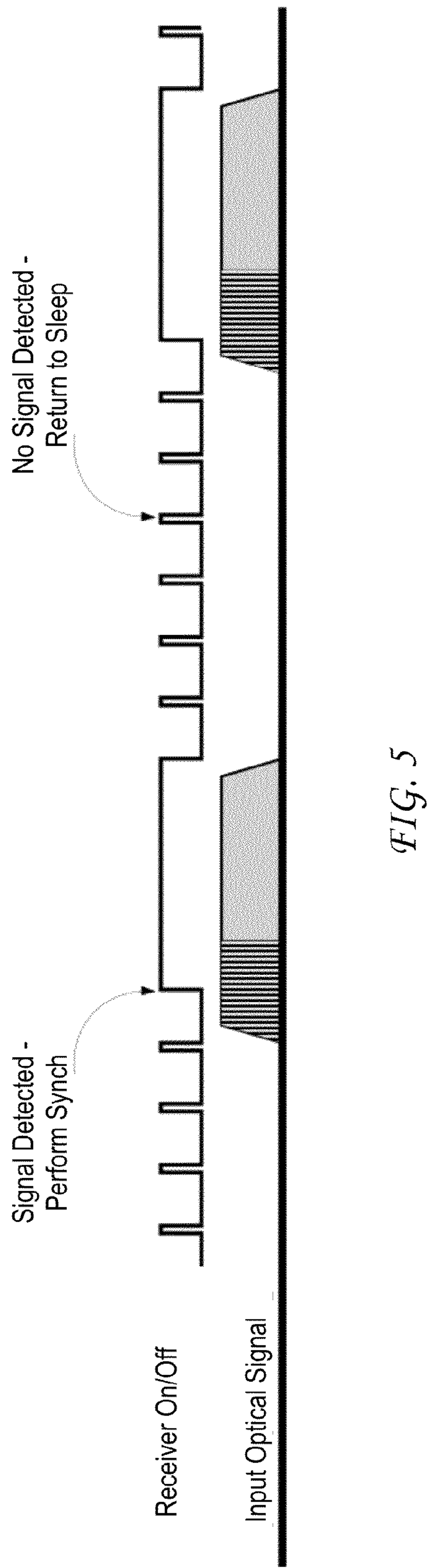
FIG. 5 illustrates an example of a receiver operation for a burst mode in a point-to-point link application.

FIG. 5 illustrates an example of a receiver operation for a burst mode. As illustrated, the burst-mode receiver can be configured to enter a sleep state if it sees the input signal disappear. This, of course, would correspond to the completion of the $T_{off}$ time interval at the laser on the other end of the link. Once in the sleep state, the receiver can be configured to periodically wake up, load the stored AGC coefficients, and check whether an input optical signal is present. In one embodiment, the receiver can be configured to determine whether the input optical signal power level is greater than a pre-defined power level. If the receiver determines that the input optical signal power level is less than the predefined power level, then the receiver can reset the sleep timer and re-enter the sleep state. If, on the other hand, the receiver determines that the input optical signal power level is greater than the predefined power level, then the receiver can attempt synchronization.

In one embodiment, the burst mode receiver can be used in combination with a burst mode transmitter in a point-to-point link. In another embodiment, the burst mode receiver can be used in combination with a burst mode transmitter in a passive optical network (PON) where a single optical line terminal (OLT) at a head end can be configured to communicate with a plurality of optical network units (ONUs) at various end nodes. In various embodiments, the PON can be based on EPON such as that defined by IEEE 802.3, GPON, BPON, xGPON, or NGPON defined by ITU-T, BIPON, or the like. In one example, the burst mode receiver can be used in combination with a burst mode transmitter in an OLT in a PON. This enables further power savings as compared to PON OLTs that implement continuous mode receivers. In another example, the burst mode receiver can be used in combination with a burst mode transmitter in an ONU in a PON.

As would be appreciated, the particular length of time between the wake-up intervals can be selected to correspond with particular latency requirements imposed on the link. The greater the wake-up intervals, the greater the potential delay in synchronizing the transmitter and receiver for subsequent data transmission.

In one embodiment, the PHY-based burst-mode can also accommodate a higher-layer frame-based keep-alive mechanism. For example, IEEE 802.3 OAM keep-alive mechanism specified a 1 fr/sec minimum keep-alive mechanism. In this example, the keep-alive data that is received over the MAC/PHY interface can prompt the burst-mode PHY to transition its laser from an off state to an on state.

Figure 6:
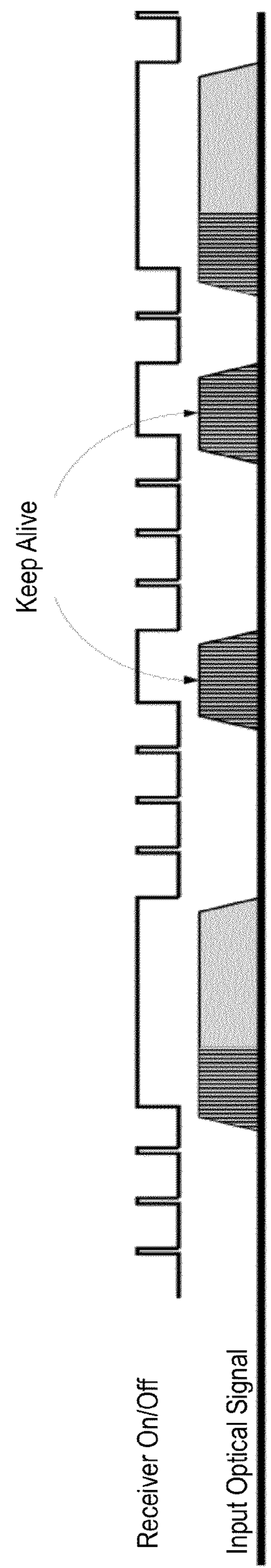
FIG. 6 illustrates an example operation of a keep-alive mechanism by a burst-mode physical layer device according to the present invention.

FIG. 6 illustrates an example operation of a keep-alive mechanism that can be implemented by a burst-mode PHY according to the present invention. As illustrated, the burst-mode PHY would periodically (e.g., every T sec) wake up and transmit a synchronization sequence, even if there is no data to send. Here, if the receiver does not receive a synchronization sequence within an interval N×T (where N is some predefined integer), the receiver will assume a loss of signal.

In one embodiment, to ensure interoperability with a legacy transceiver in a remote link partner, a burst-mode transceiver would operate in a continuous mode upon initial boot-up. As part of a discovery process, the burst-mode transceiver can periodically replace an idle code group with a control ordered set with a predefined value. When a burst-mode transceiver receives the control ordered set with a predefined value, it recognizes that the remote end is also burst-mode capable and would then enable the burst-mode operation for its own laser and receiver. In another embodiment, an extended auto-negotiation mechanism can also be used to indicate support for the burst-mode operation. In one example, the auto-negotiation mechanism could be used to determine whether burst-mode transmission is to be used in a single direction or both directions. Even where the capabilities exist to support a burst mode in a particular direction, the auto-negotiation mechanism can be further used to determine whether the burst mode is desired to be used in that particular direction. In general, the auto-negotiation process can be used in distinguishing between the capabilities of a particular direction of the link and the configuration of a particular direction of the link. In yet another embodiment, higher-layers may implement a protocol and exchange frames (e.g., OAMPDUs), similarly to OAM discovery.

Figure 7:
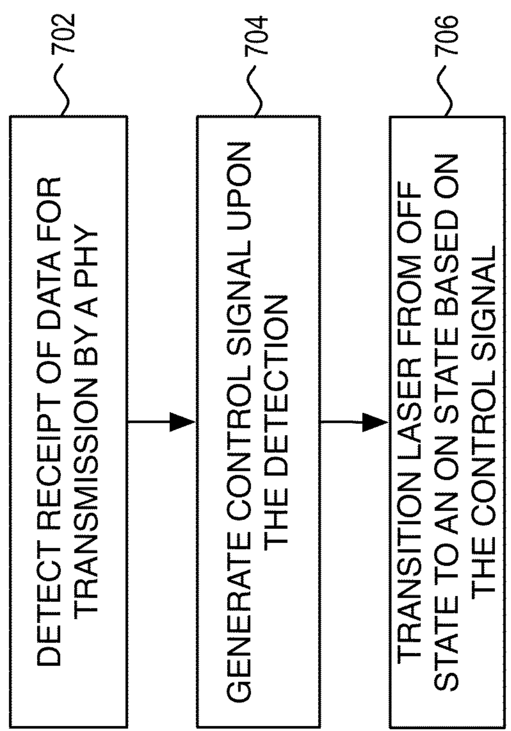
FIG. 7 illustrates a flowchart of an example process of the present invention.

Having described a framework for enabling burst-mode transmission in a point-to-point link, reference is now made to FIG. 7, which illustrates a flowchart of an example process of the present invention. This example process of the present invention can be applied in a scenario where a burst-mode PHY is available for transmission. For example, the burst-mode PHY can be part of a point-to-point link. In another example, the burst-mode PHY can be part of a point-to-multipoint link where it is in an available time window of operation.

As illustrated, the process begins where a laser in a burst-mode PHY is in an off state. At step 702, the burst-mode PHY detects a receipt of data from the MAC for transmission by the burst-mode PHY. As noted above, this detection can be implemented based on monitoring of a buffer, or of a part of an interface with a MAC. The detection of the receipt of data for transmission can be performed by a data detector in the burst-mode PHY. Detection of the availability of data for transmission would then trigger, at step 704, the generation of a control signal by the data detector. As would be appreciated, this control signal can be implemented in various ways.

At step 706, this control signal would enable a transition of the laser from an off state to an on state to facilitate the transmission of data. This transmission would continue until the data detector determines the absence of data for transmission. As noted, in one embodiment, the data detector can determine that the buffer contains only idle code groups. Such idle code groups can be discarded after the laser subsequently transitions from the on state back to the off state.

Here, it should be noted that the MAC and higher layers would be unaware of the various transitions of the burst-mode PHY between the laser on state and the laser off state. For example, the MAC can continue to operate in the continuous mode during the various transitions of the laser by the burst-mode PHY between the on state and the off state. This is in contrast to conventional IEEE 802.3az data link layer state machines that are implemented above the MAC/PHY interface.

In the present invention, it is recognized that the PHY-based control of laser transitions between the on state and the off state enables the energy-saving function to be implemented entirely within the PHY module without modification of a legacy MAC/PHY interface. This enables the energy-saving function of the burst-mode PHY to be implemented in a pluggable module.

It is further recognized that the principles of the present invention enable energy savings with a constant link propagation delay. This enables the energy-saving mechanism of the present invention to be compatible with higher-layer functions.

Figure 8:
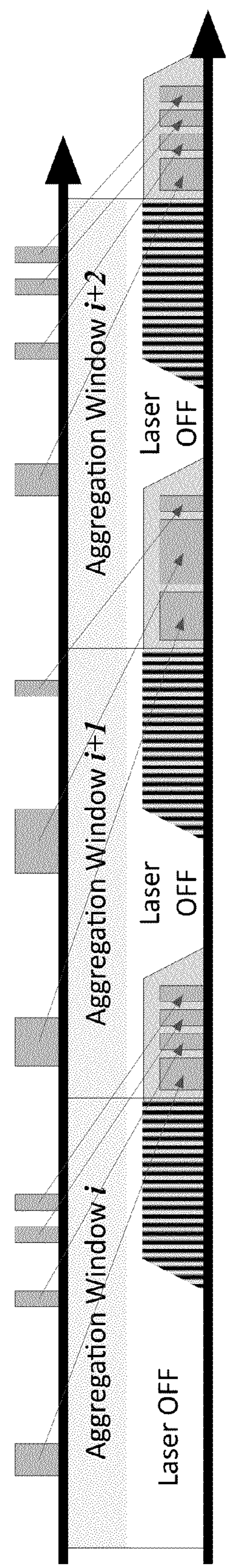
FIG. 8 illustrates an example of an aggregation of packets by a higher layer.

In one embodiment, the PHY-based control of the present invention can also operate in tandem with higher-layer functions. For example, higher-layer devices can artificially increase traffic burstiness by accumulating or aggregating multiple packets in a queue up to a defined level before transmitting the packets to the PHY. This increases the amount of time between bursts, which thereby increases the opportunity for energy savings. FIG. 8 illustrates an example of an aggregation of packets by a higher layer. As illustrated, the packets received during one aggregation window are accumulated and transmitted back to back, thereby eliminating gaps between the packets. As a consequence, larger gaps are created between the groups of aggregated packets, which enables the laser to be turned off for at least part of the time.

As noted above, the energy savings can be generated on each direction of the link independently. This feature of the present invention enables the potential for asymmetric operation where one direction of a link operates in a continuous mode, and the other direction of the link operates in a burst mode. This scenario can be used, for example, in a mobile backhaul applications for timing distribution to a base stations. In such applications, the return path (from base station to central office) can be configured to operate in the burst mode.

In a further embodiment, a low-data-rate management channel can also be added to the overhead at the beginning of a burst. The functions supported by this low-data-rate management channel could be similar to those supported by the LLDP-based layer-2 protocol built into energy efficiency Ethernet (IEEE 802.3az), thus allowing the implementation of higher-layer energy utilization policies and enabling additional energy savings on the link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A physical layer device, comprising:

a data detector that is configured to generate a first control signal upon receipt of a non-idle code group over an interface between the physical layer device and a media access control device and to generate a second control signal when all data received from the media access control device has been transmitted by the physical layer device;

a laser for transmission of data over a point-to-point optical network link to a remote transceiver, the laser being configured to perform a first transition from an off state to an on state based on the first control signal, and to perform a second transition from the on state back to the off state based on the second control signal, wherein the sequence of the first transition and the second transition enables the laser in the physical layer device to transmit a burst of traffic received from the media access control device; and a receiver that is configured to wake up periodically from a sleep state and to perform a synchronization when it is determined that an input optical signal level is greater than a predefined power level;

wherein the laser is further configured to remain in the on state after initialization until receipt, by the receiver, of a predetermined code group from a second physical layer device of the remote transceiver; and wherein the laser is configured to first transition to the off state responsive to receipt of the predetermined code group.

2. The physical layer device of claim 1, wherein the data detector is part of a physical coding sublayer of the physical layer device.

3. The physical layer device of claim 1, wherein the second control signal is generated when a buffer in the physical layer device only contains idle code groups.

4. The physical layer device of claim 1, wherein the laser is further configured to periodically transition from the off state to the on state to transmit a synchronization sequence.

5. The physical layer device of claim 1, wherein the physical layer device is part of a pluggable SFP, SFP+, XENPAK, X2, XFP or XPAK module.

6. A method, comprising:

detecting, by a physical layer device that is coupled to a transceiver of a remote link partner via a point-to-point optical link, a receipt of a plurality of non-idle code group over an interface between the physical layer device and a media access control device, the plurality of non-idle code groups aggregated over a first time period by the media access control device and provided to the physical layer device over a second, shorter time period;

generating a first control signal upon the detected receipt of the plurality of non-idle code groups; and responsive to having received a predetermined code group from the transceiver of the remote link partner:

transitioning a laser in the physical layer device from an off state to an on state in response to the generated first control signal;

transmitting, by the laser, data received over the interface to the transceiver of the remote link partner; andafter completion of the transmission of the data received over the interface, transitioning the laser from the on state back to the off state;

the laser having been configured to remain in the on sate after initialization until receipt of the predetermined code group from the transceiver of the remote link partner.

7. The method of claim 6, wherein the transitioning of the laser from the on state back to the off state is based on a second control signal that is generated when a buffer in the physical layer device contains only idle code groups.

8. The method of claim 6, wherein the transitioning of the laser from the on state back to the off state is based on a second control signal that is generated when a buffer in the physical layer device contains only idle code groups for a defined period of time.

9. The method of claim 6, wherein the generating of the first control signal is performed by a data detector in a physical coding sublayer of the physical layer device.

10. A network device, comprising:

a media access control device;

a first physical layer device that is configured for communication with a remote second physical layer device, the first physical layer device including:

a data detector that is configured to generate a control signal upon receipt of a non-idle code group over an interface between the first physical layer device and the media access control device;

a laser for transmission of data over an optical network cable, the laser being configured to:

perform a first transition from an on state after initialization to an off state upon receipt by a receiver of the first physical layer device of a predetermined code group from the remote second physical layer device, perform a second transition from an off state to an on state based on the control signal, and perform a third transition form the on state back to the off state upon completion of the transmission of the data; and the receiver, configured to wake up periodically from a sleep state and to perform a synchronization when it is determined, using a stored automatic gain coefficient, that an input optical signal level is greater than a predefined power level.

11. The network device of claim 10, wherein the laser is further configured to periodically transition from the off state to the one state to transmit a synchronization sequence.

12. The network device of claim 10, wherein the first physical layer device is part of a pluggable SFP, SFP+, XENPAK, X2, XFP or XPAK module.

13. The network device of claim 10, wherein the receiver is further configured to awaken periodically to determine if a signal is detected from the second physical layer device, wherein the receiver returns to an off state if no signal is detected and transitions to an on state if a signal is detected.

14. The network device of claim 13, wherein the on and off states of the laser are independent of the on and off states of the receiver.

15. The network device of claim 10, wherein the first transition is not controlled by signals received from the media access control device.

16. The network device of claim 10, wherein the data detector is further configured to generate a second control signal when it is determined that no data is available for transmission by the first physical layer device to the second physical layer device, the second transition being based on the second control signal.

17. The network device of claim 16, wherein the second control signal is generated when it is determined that a buffer in the first physical layer device does not contain data for transmission.

18. The network device of claim 1, wherein the receiver is further configured to perform synchronization when it is determined that the input optical signal is greater than the predefined power level based on a stored automatic gain control coefficient determined during receipt of a prior input optical signal.

19. The network of claim 10, wherein the laser is further configured to remain in the on state after initialization until receipt, by the receiver, of a predetermined code group from a second physical layer device;

and wherein the laser is configured to first transition to the off state responsive to receipt of the predetermined code group.

20. The network device of claim 1, wherein the laser is further configured to periodically transmit a predetermined code group in place of an idle code group.

* * * * *